Feb. 6, 1940.  E. E. MILLER  2,189,349

MUD PUMP PISTON

Filed Nov. 21, 1938

Inventor
ERWIN E. MILLER

By Hazard & Miller
Attorneys

Patented Feb. 6, 1940

2,189,349

UNITED STATES PATENT OFFICE 2,189,349

MUD PUMP PISTON

Erwin E. Miller, Fullerton, Calif.

Application November 21, 1938, Serial No. 241,491

9 Claims. (Cl. 309—23)

This invention relates to improvements in mud pump pistons and may be considered as an improvement over the disclosure made in my co-pending application Serial No. 137,984, filed April 20, 1937.

An object of the present invention is to provide an improved form of mud pump piston which is of such design as to effectively resist expansion of the rubber adjacent the center of the piston to prevent its being forced around the metal flange of the frame of the piston.

Heretofore, it has been customary to provide mud pump pistons usually formed of two opposed parts. Each of the opposed parts is designed to be mounted on a piston rod and has a metal frame providing a hub portion and a flange or plate. The flange or plate portions of the piston frame are designed to substantially fit the interior of the liner of the mud pump. Rubber or similar composition is molded onto the frame around the hub and against the flange or plate and is vulcanized. This rubber provides the body of the piston and the periphery thereof is designed to form a seal with the walls of the liner. Frequently the ends of the rubber body are equipped with slightly flaring lips to contribute to the formation of a seal with the walls of the liner.

It has been found, however, that with the use of pistons as above generally described, when subjected to high pressures that the rubber becomes badly squeezed. Worn pistons recovered from mud pumps that have been subjected to high pressures are found to be grooved adjacent the metal flange. I am not to state exactly what causes the rubber to groove adjacent the metal flange but apparently this is due to the rubber adjacent the flange being forced under the high pressure to expand and wedge between the edge of the flange and the walls of the liner so that this rubber on reciprocation of the piston is sheared or chewed off, thus forming the groove. It is desirable of course to provide the piston with relatively flexible lips at the ends, but in order to prevent the rubber adjacent the flange from being removed it is highly desirable to have that portion of the rubber body adjacent the flange adequately reinforced against expansion even when subjected to extreme pressures on the ends of the piston.

Specifically, it is a further object of the invention to provide an improved form of mud pump piston which provides a simple and durable construction that will adequately reinforce the rubber body of the piston adjacent the flange on the piston frame retaining the rubber so that it cannot be expanded between the flange and the walls of the liner, yet preserving the desirable flexible lips at the ends of the piston.

With the foregoing and other objects in view, which will be made manifest in the following detailed description and specifically pointed out in the appended claims, reference is had to the accompanying drawing for an illustrative embodiment of the invention, wherein:

Figure 1:
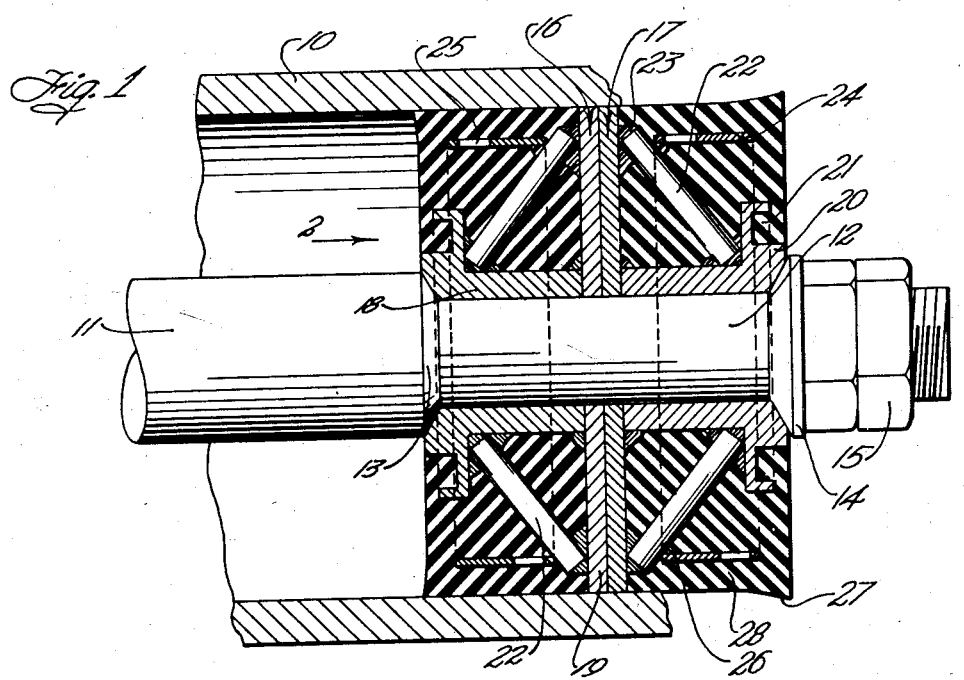
Figure 1 is a vertical section through a mud pump liner illustrating the mud pump piston embodying the present invention in section therein.
Figure 2:
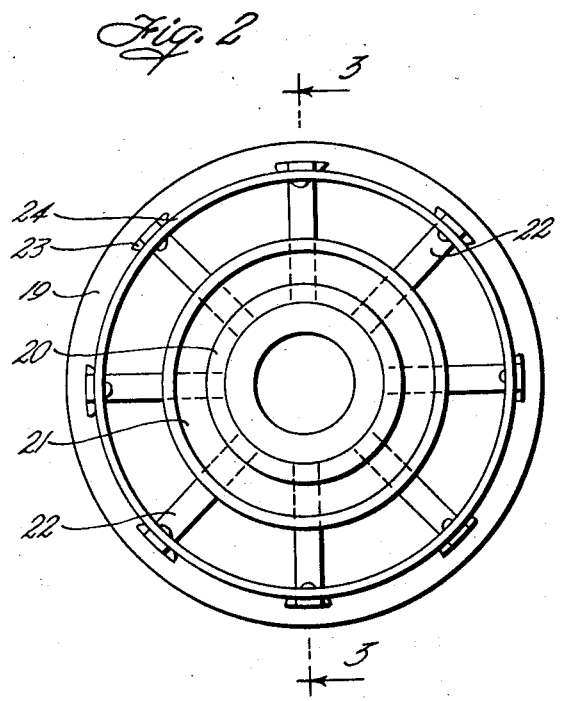
Fig. 2 is a view in end elevation of one of the parts forming the metal frame for the piston.
Figure 3:
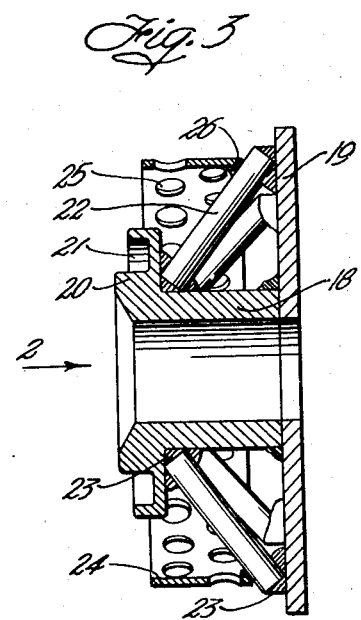
Fig. 3 is a vertical section taken substantially upon the line 3—3 upon Fig. 2.

Referring to the accompanying drawing wherein similar reference characters designate similar parts throughout, 10 designates the liner of the mud pump and 11 the piston rod therefor, one end of which is of reduced size as indicated at 12, there being an intervening tapered shoulder 13. A suitable washer 14 may be positioned against the outer side of the piston and is tightened against the piston by means of nuts 15. The above-described construction conforms to conventional construction of a mud pump.

The present invention concerns the construction of the piston applicable to the piston rod. The improved piston consists of a metal frame made up of two exposed parts generally designated at 16 and 17. These parts are counterparts of each other, each consisting of a cylindrical portion 18 forming the hub which fits about the reduced end 12 and a flange 19 formed either integral therewith or welded thereto. The two flange portions 19 are assembled in abutting relation and cooperate to form a central metal flange on the frame of the piston designed to substantially fit the walls of the liner 10. The outer ends of the hub portions may be equipped with smaller flanges 20 and their outer faces may be grooved as at 21. Arms 22 extend upwardly and inwardly from the outer ends of the hub portion of the frame toward the outer faces of the flanges 19 adjacent the edge of the central flange which is formed thereby. These arms may be in the form of small sections of steel rods spaced radially around each frame part and welded in position as by welds 23. Adjacent the inner ends of the arms there is secured a metal band 24. This metal band preferably is endless in that it has its ends welded together so as to be comparatively inexpansible. The band is preferably perforated with perforations 25 and extends outwardly from the inner ends of the arms toward the ends of the piston. The width of each band is such that it extends the major portion of the length of the rubber on its respective part of the piston stopping short of the extreme end so as to leave the lip flexible. The band is of somewhat smaller diameter than the diameter of the central flange of the frame. Its inner edge is fastened to the inner ends of the arms such as by welds 26. When the frame parts of the piston are thus constructed they are positioned in a mold and rubber stock is molded around the hub portion between the arms and on the inside and outside of the band 24. This rubber stock is then vulcanized and in the preferred form of construction the mold is so shaped as to form slightly outwardly flaring lips 27. It will be noted that the band 24 is spaced inwardly a short distance from the periphery of the rubber body so that there is adequate rubber at 28 to bear against the walls of the liner 10.

The two sections of the piston are assembled on the piston rod as shown in Fig. 1. In this form of construction even though extremely high pressures are effective on the end faces of the rubber body, the presence of the inexpansible metal band 24 resists expansion thereof. Although the lips 27 are still sufficiently flexible to form the seal with the liner the expansion of the rubber adjacent the edge of the central flange is sufficiently prevented by the band 24 to prevent the rubber from grooving adjacent the central flange. In this way, by reinforcing the rubber in such a manner as to resist expansion adjacent the central flange the life of the piston is effectively prolonged.

Various changes may be made in the details of construction without departing from the spirit or scope of the invention as defined by the appended claims.

I claim:

1. A mud pump piston comprising means providing a hub adapted to fit on a piston rod, means providing a central flange on the hub designed to substantially fit the liner of a mud pump, rubber molded around said hub and against said flange forming the body of the piston, and inexpansible metal bands rigid with the flange embedded in the rubber between the flange and the ends of the piston adjacent the periphery thereof and extending the major portion of the length of the rubber from the flange.

2. A mud pump piston comprising means providing a hub adapted to fit on a piston rod, means providing a central flange on the hub designed to substantially fit the liner of a mud pump, rubber molded around said hub and against said flange forming the body of the piston, and inexpansible metal bands rigid with the flange embedded in the rubber between the flange and the ends of the piston adjacent the periphery thereof, said bands being perforated and extending the major portion of the length of the rubber from the flange.

3. A mud pump piston comprising means providing a hub adapted to fit on a piston rod, means providing a central flange on the hub designed to substantially fit the liner of the pump within which the piston rod is reciprocable, arms connecting the outer ends of the hub with the flange adjacent the edge thereof, rubber molded around the hub and arms and against the flange, and means extending outwardly from the arms toward the ends of the piston embedded in the rubber adjacent the periphery thereof for resisting expansion of the rubber adjacent the flange.

4. A mud pump piston comprising means providing a hub adapted to fit on a piston rod, means providing a central flange on the hub designed to substantially fit the liner of the pump within which the piston rod is reciprocable, arms connecting the outer ends of the hub with the flange adjacent the edge thereof, rubber molded around the hub and arms and against the flange, and bands secured to the arms and extending outwardly therefrom toward the ends of the piston embedded in the rubber adjacent the periphery thereof, said bands being relatively inexpansible and serving to resist expansion of the rubber adjacent the flange.

5. A mud pump piston comprising means providing a hub adapted to fit on a piston rod, means providing a central flange on the hub designed to substantially fit the liner of the pump within which the piston rod is reciprocable, arms connecting the outer ends of the hub with the flange adjacent the edge thereof, rubber molded around the hub and arms and against the flange, and bands secured to the arms and extending outwardly therefrom toward the ends of the piston embedded in the rubber adjacent the periphery thereof, said bands being relatively inexpansible and serving to resist expansion of the rubber adjacent the flange, said bands being perforated.

6. A mud pump piston comprising two opposed parts, each part providing a metal hub adapted to be placed on a piston rod and having a flange adjacent one end thereof, said flanges being adapted to assume abutting relation and to substantially fit a liner of a mud pump, rubber molded around the hub of each part and against its respective flange, and a metal band rigid with respect to the flange embedded in the rubber adjacent the periphery thereof extending from adjacent the flange to adjacent the outer end of the rubber, said metal band being relatively inexpansible to resist expansion of the rubber through the major portion of its length.

7. A mud pump piston comprising two opposed parts, each part providing a metal hub adapted to be placed on a piston rod and having a flange adjacent one end thereof, said flanges being adapted to assume abutting relation and to substantially fit a liner of a mud pump, rubber molded around the hub of each part and against its respective flange, and a metal band rigid with respect to the flange embedded in the rubber adjacent the periphery thereof extending from adjacent the flange to adjacent the outer end of the rubber, said metal band being relatively inexpansible to resist expansion of the rubber through the major portion of its length, said band being perforated.

8. A mud pump piston comprising means providing a hub adapted to fit on the piston rod, means providing a central flange rigid with the hub designed to substantially fit the liner of a mud pump, rubber molded around said hub and against said flange and vulcanized thereto forming the body of the piston, and inexpansible reinforcements rigid with the flange and extending the major portions of the distances therefrom to the ends of the piston, said reinforcements being embedded in the rubber.

9. A mud pump piston comprising two opposed parts, each part providing a metal hub adapted to be placed on a piston rod and having a flange rigid therewith adjacent one end thereof, said flanges being adapted to assume abutting relation and to substantially fit a liner of a mud pump, rubber molded around the hub of each part and against its respective flange and vulcanized thereto, and metal reinforcements rigid with each flange embedded in the rubber and extending the major portion of the length of the rubber adjacent the periphery thereof.

ERWIN E. MILLER.